United States Patent [19]

Crotti

[11] Patent Number: 4,716,644

[45] Date of Patent: Jan. 5, 1988

[54] UNIT COMPRISING A SHAFT AND ROTATABLE BODY IN ROLLING CONTACT, SERVING AS ROLLER OR WHEEL IN EARTH-MOVING VEHICLES, AND RELATIVE METHOD OF ASSEMBLY

[75] Inventor: Aldo Crotti, Castelnuovo Rangone, Italy

[73] Assignee: Italtractor ITM S.p.A., Potenza, Italy

[21] Appl. No.: 801,855

[22] Filed: Nov. 26, 1985

[30] Foreign Application Priority Data

Nov. 30, 1984 [IT] Italy ................................ 40112 A/84

[51] Int. Cl.[4] .................................................. B23P 11/00
[52] U.S. Cl. ...................................................... 29/525
[58] Field of Search ................ 29/123, 129, 168, 521, 29/525; 305/22, 28

[56] References Cited

U.S. PATENT DOCUMENTS 4,506,934 3/1985 Hammond ........................ 305/22 X

*Primary Examiner*—Timothy V. Eley
*Attorney, Agent, or Firm*—Browdy and Neimark

[57] ABSTRACT

A roller or wheel of the type in question has rolling bearings (5) which must be pre-loaded; a unit and relative method of assembly as disclosed offers simple fitment of component parts, accurate pre-load, and economy of manufacture. The two bearings (5) are checked axially by external limiting means (9) and internal limiting means (8); the method of assembly features a step of compacting the component parts axially to the point where the reaction produced by the parts thus urged together offsets the applied compacting force, and a subsequent step of spreading the external limiting means (9) in such a way as to arrive at the requisite bearing pre-load.

10 Claims, 6 Drawing Figures

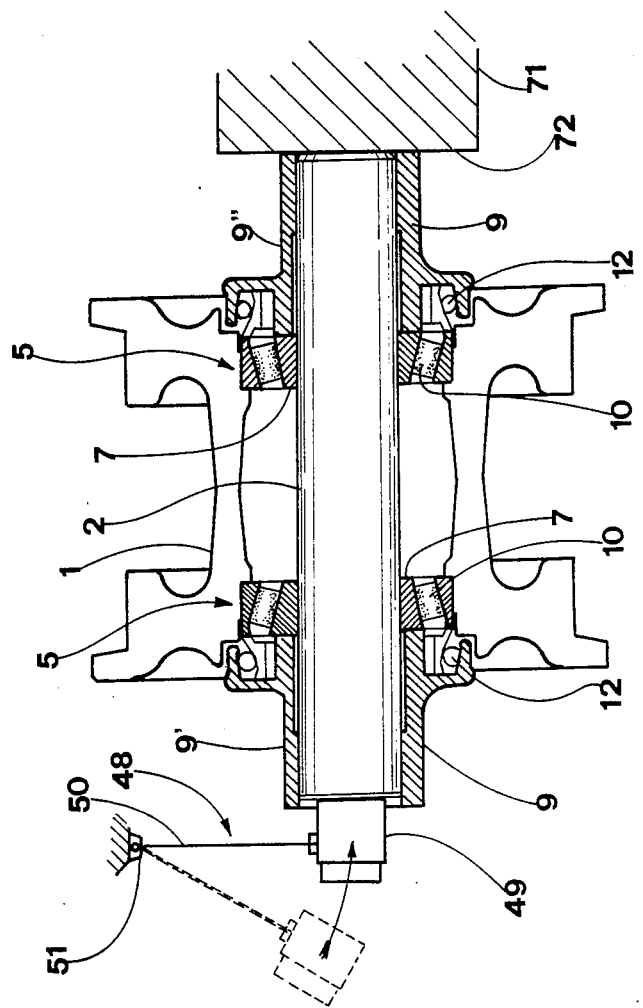

UNIT COMPRISING A SHAFT AND ROTATABLE BODY IN ROLLING CONTACT, SERVING AS ROLLER OR WHEEL IN EARTH-MOVING VEHICLES, AND RELATIVE METHOD OF ASSEMBLY

BACKGROUND OF THE INVENTION

The invention disclosed relates to roller or wheel units in earth-moving vehicles, of a type which require limiting means to check end float of the rotatable body, and where pre-loading of such end float needs to be more than somewhat precise.

An application in which the invention would be employed to advantage is that of rollers or wheels turning on rolling bearings, which become subject to not inconsiderable thrust loads when the machine is in operation; a typical example would be the bottom rollers of crawler vehicles. In such an application as this it is good engineering to pair the roller and shaft together with a pair of taper roller bearings located between the two; such bearings not only give long service life, but offer notably good resistance to thrust loads.

The invention is similarly applicable however in the case of roller or wheel units turning on ball bearings, a typical example of which is that of the top rollers of crawler vehicles, and is applicable likewise in the case of idler wheels.

This much asserted, it is nonetheless quite possible for ball bearings to be fitted to bottom rollers and idler wheels, and for taper roller types to be fitted to top rollers.

In conventional crawler track rollers having rolling radial bearings (whether taper roller or ball type), the outer ring of the bearing is generally integral with the inner surface of the roller component (which consists of a hollow body having a longitudinal bore of section significantly larger than the section of the shaft), whilst the inner ring fits positively over the shaft.

In order to inhibit movement of the roller body through an axial direction, along the shaft, one has the inclusion of internal limiting means which generally take the form of shoulders located in the bore of the roller body, and prevent the outer ring of the bearing from sliding in toward the center, and of external limiting means, generally taking the form of annular brackets, which prevent the inner ring of the bearing from drifting outwards. In certain instances, the internal limiting means will consist of shoulders located in the shaft, which check the bearing inner ring, whilst the external limiting means consist of annular brackets integral with the roller body, which check sliding movement of the outer ring.

A person skilled in the art will know that correct operation of radial bearings, and especially of taper roller bearings, depends on permissible end float being set with extreme precision, that is: too short a relative axial distance between the cone (the inner ring) and the cup (outer ring) of the bearing will cause their opposed surfaces likewise to be too tightly spaced, and rollers located between the two will be unduly compressed; difficulty in producing rolling motion ensues, as a result of which excessive friction is generated. Where the same relative axial distance is long, poor operation also results, this time occasioning early wear of the taper rollers at certain key points. In short, relative axial distance between cone and cup must be absolutely precise in order to ensure optimum performance of the bearing, and this is a condition which automatically dictates a high degree of precision in selecting the relative axial positions of the internal and external limiting means, since these in effect establish the relative axial distance between the cone and cup of the taper roller bearing.

The prior art affords substantially two different methods of ensuring the aforesaid precision.

In a first method, the distance between the internal limiting means (shoulders incorporated into either the roller body or the shaft) is fixed, whereas external limiting means are provided which can be adjusted for position, by way, for example, of lock-nuts screwed onto the shaft, or of brackets bolted to the roller body the position of which can be altered by introducing shims; in this way one obtains the correct relative position between the cup and cone of each bearing by compensating for the axial machining tolerances of the separate components. Such a method is effective enough insofar as acceptable pre-load of the bearing float is obtained, and correct operation thus ensured; nevertheless, costly and complex parts are needed (locknuts, threads, shims and c.), and besides, each roller requires adjusting singly, involving a lengthy and by no means sample procedure.

The second method makes use of fixed-distance internal limiting means as above, and of similarly fixed-distance external limiting means (brackets set on the shaft which abut with snap rings located in grooves machined in the shaft itself). With this type of method it is clearly essential that axial machining tolerances envisaged for the separate components must be considerably tight, as a result of which it is impossible, in practice, to ensure good bearing pre-load; bearings thus operate in hostile conditions and early wear is occasioned, especially in the case of taper roller types. The upshot of such a situation is that new bearings must be fitted at least once during the life of the roller, signifying drawbacks in terms of the vehicle being out of service, of the work involved, and of expense on parts. The bearings, moreover, operating in such hostile conditions, are unable to withstand radial or thrust loads of a high order, and the use of this type of unit in crawler tracks is thus limited to top roller applications for which loads are lighter than those on bottom rollers. At all events, the components still require precision machining, and production costs are therefore high.

The problems and drawbacks described above are experienced generally in all units featuring a shaft and a rotatable body—that is, either highly accurate machining is required in order to build in the requisite pre-load, or, special means must be utilized in order to compensate for axial machining tolerances.

The object of the invention is one of embodying a roller or wheel unit which features low manufacturing costs, by virtue of the fact, first, that it requires no precision machining, and second, that assembly is rendered swift and simple; such a unit is also highly dependable by reason of the precision obtained in thrust pre-load.

Applied to rollers or wheels with rolling bearings, thrust pre-load according to the invention is highly accurate and obtains the optimum setting; bearings are thus able to provide maximum specified service life by virtue of their operating in ideal conditions. Accurate pre-load also permits of the bearing's withstanding high loads, thrust and radial alike, signifying that the roller can be employed in the most heavy duty of conditions (e.g. bottom roller in a tracked vehicle).

With wear on bearings reduced to a minimum, the life of the bearing will either match or outstrip that of the roller itself, the result being that the roller will not normally require any servicing which calls for repair or replacement of bearings.

Thrust pre-load according to the invention is extremely precise, and certainly more accurate than that obtained normally with those prior art methods aforementioned designed to compensate for machining tolerances.

SUMMARY OF THE INVENTION

The stated object and advantages are realized with a unit according to the invention, as well as by a method of assembly and means of assembly as defined by the appended claims.

Generally considered, a unit according to the invention comprises a pair of limiting means integral with the shaft or with the rotatable body, which are disposed singly at either side of the rotatable body and designed to check axial movement of the rotatable body itself, whilst the relative method of assembly envisages compaction of the rotatable body and interconnected limiting means by applying thrust designed to draw at least a first of the limiting means toward its counterpart through the axial direction, to theds point where the reaction produced by the assembly of rotatable body and interconnected limiting means is equal to such thrust.

The aforesaid first limiting means consists of a check element pressed either onto the shaft or into the axial bore of the rotatable body such that an interference fit is created of sufficient force to withstand external thrust, whereas the aforementioned thrust applied for the purpose of drawing the assembly together is greater than the force created by the interference fit between the check element and shaft, or between the check element and rotatable body.

The method envisages subsequent spread of the limiting means by a calculated amount over and above the distance arrived at following the previous step of compaction, by applying thrust such as will cause at least the aforesaid first of the limiting means to slide axially either along the shaft, or through the axial bore of the rotatable body.

A typical application of the invention would be one in which the roller or wheel unit comprises a pair of external limiting means locked axially to the shaft and designed to check axial shift, and a pair of bearings located between the rotatable body and the external limiting means, each of which has two rings capable of relative movement through an axial direction; more exactly, one such ring integral with the rotatable body and checked axially by respective internal limiting means, the other fitting positively over the shaft and checked axially by respective external limiting means, that is, located externally of the bearing and registering with the side face of the ring.

BRIEF DESCRIPTION OF THE DRAWINGS

The invention will now be described in detail with the aid of the accompanying drawings, in which:

FIG. 6 illustrates yet another alternative embodiment of the means shown in FIG. 3.

DESCRIPTION of the PREFERRED EMBODIMENTS

Figure 1:
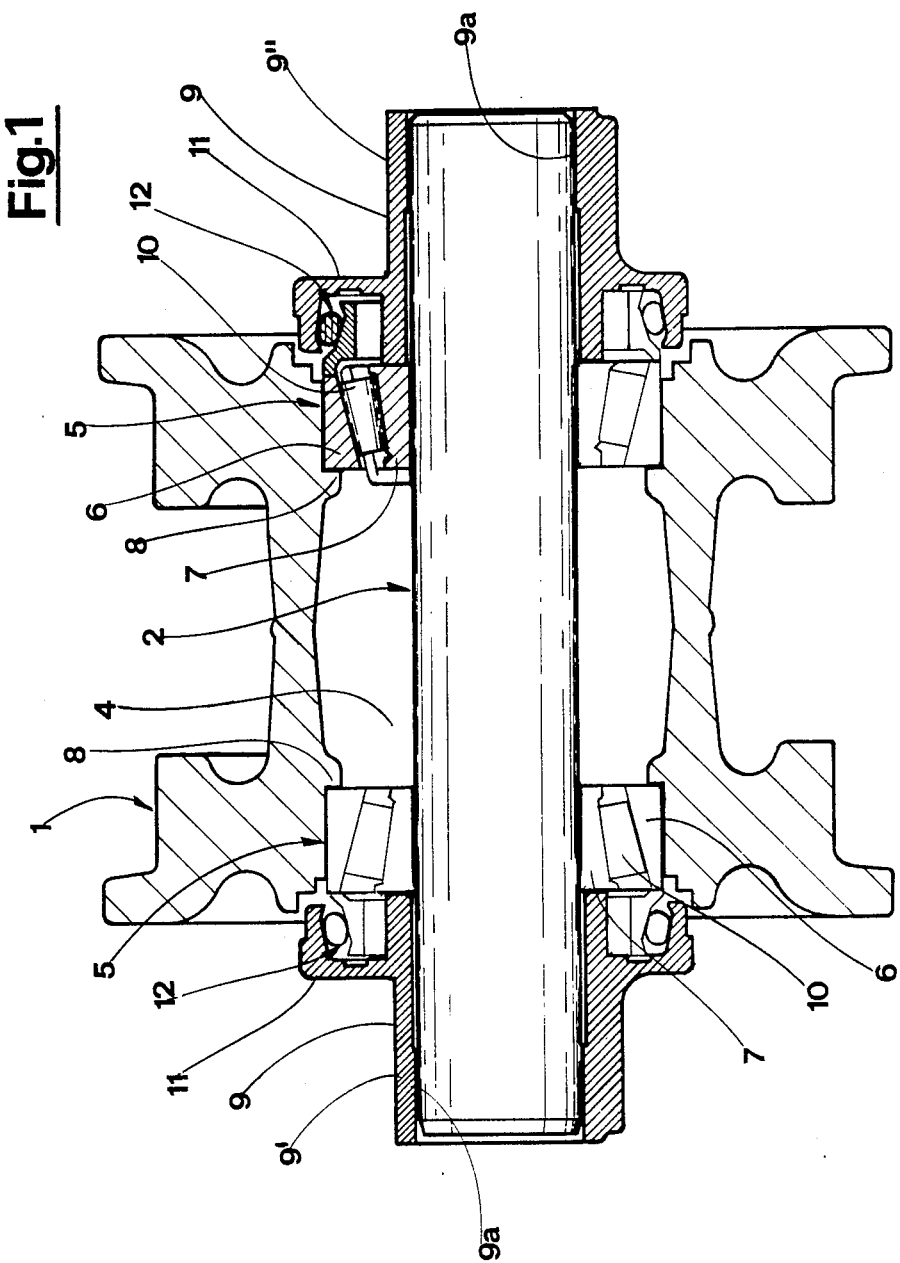
FIG. 1 is the axial section through an assembled unit serving as roller for a crawler track and fitted with taper roller bearings.

The assembled unit illustrated in FIG. 1 is a typical example of a bottom track roller, though it could also be employed for top roller or idler wheel applications.

1 denotes a rotatable body turning about a shaft 2 which is fitted fixedly by way of its ends to the main structure of the vehicle.

The rotatable body 1 exhibits the shape, and performs the function, of a roller, provided as it is with cylindrical surfaces that roll against the track links; a large axial bore 4 is also provided which accommodates the shaft 2.

A pair of taper roller bearings 5, located one at each end of the bore 4, provide the means by which the body 1 is journalled in rotation to the shaft 2. The outer ring, or cup 6 of each bearing is integral with the surface of the bore 4, whereas the inner ring, or cone 7 is fitted over the shaft 2. The inside face of each cup 6 registers with a radial shoulder 8 offered by the inside of the body 1, which projects a short distance toward the shaft axis; such shoulders 8 constitute internal limiting means which check the bearings 5 from shifting through the axial direction toward the center of the rotatable body 1. In order to check axial drift of the bearings 5 away from center, external limiting means 9 are provided which register with the outside face of the bearing cones 7. Thus, the bearings 5 are positioned axially between the shoulders 8 and the external limiting means 9.

The bearing rollers 10 are tapered, and turn with their greater base directed away from the center of the body 1. Axial shift of a cone 7 toward center would shorten the distance between the opposed surfaces of the cup and cone of that bearing, drawing them together; such shift is therefore inhibited by the presence of the rollers 10. On the other hand, movement of the cone 7 away from center in the axial direction is inhibited, not by the rollers 10, but by the external limiting means 9. In short, the body 1 is checked axially by the two bearings 5, and these in their turn are checked by the external limiting means 9.

An annular chamber is created inside of the bore 4, bounded by the surface of the shaft 2, by the body 1, and by the bearings 5; this chamber contains a permanent supply of lubricant for the bearings 5.

The external limiting means 9 take the form of hollow sleeves, a first denoted 9' on the left of the drawing, and a second denoted 9" at right, which are pressed onto the outer ends of the shaft 2, thus creating an interference fit between the diameter of the shaft 2 and the bore of the sleeve 9. The degree of interference is calculated with considerable precision in order to produce a locking action between shaft and sleeve that may vary within a tight range of given fit tolerances. To this end, it is envisaged that the axial stretch of the sleeve which is pressed onto the shaft should be of a given precise length; the stretch in question, denoted 9a, is located at the outer end of each sleeve 9. The remainder of the sleeve makes no contact with the shaft 2, so that its bore is marginally greater than the shaft diameter. The surface of the bore running through stretch 9a is machined to extremely close tolerances; likewise, the ends of the shaft are machined to close tolerances in view of the fact that each must also fit exactly into the cone 7 of a respective bearing 5. It is also envisaged that the pressed surfaces be finished to a particularly low index of roughness, as precise as is possible.

By implementing the above techniques one is able to obtain a markedly accurate interference fit responding to a given specification; in practice, the fit tolerance specified will be such as to create a locking action, between shaft 2 and sleeve 9, of sufficient strength to withstand thrust loads (at least in part) which stress the rotatable body 1 in relation to the shaft when the vehicle is in service.

11 denotes a thin annular projection issuing from the outer surface of each sleeve 9 and exhibiting an L-shaped cross section; each such projection creates an annular enclosure in which seals 12 are located in order to prevent egress of lubricant from the rotatable body 1.

Each sleeve 9 is also integral with a transverse horizontal bracket having two holes, by way of which the shaft 2 is attached to the crawler vehicle. These brackets are associated immovably with the main structure of the vehicle, and withstand thrust loads to which the rotatable body 1 is subject, supplementing the locking action between sleeves 9 and shaft 2 as a result.

The method of assembly for a unit as shown in FIG. 1 involves, first of all, fitment of the various component parts (rotatable body 1, bearings 5, seals 12 and sleeves 9) to the shaft 2.

This accomplished, the next step is that of drawing together the cup and cone of each bearing, with the respective set of taper rollers 10 located between the two. The operation is represented schematically in FIG. 2, which illustrates a fixed reference block 41 offering a flat annular surface 42 against which the first sleeve 9' (at the left hand end of the body 1, in the drawing) is located. The block 41 is provided with a central recess 41a into which the shaft 2 may penetrate, if necessary. Thrust means 43 located at the opposite end of the shaft 2 comprise a flat plate 44 actuated by a ram 45 which is capable of delivering high power of a given specified order. The flat surface of the plate 44 is embodied in such a way that both the end of the second sleeve 9" and the end of the shaft 2 may register against it. Force produced by the thrust means 43 is greater than that produced by the interference fit between the first sleeve 9' and the shaft 2; thus, the combined effect of the thrust means 43 and the reaction of the reference block 41 is that of sliding the first sleeve 9' along the shaft 2 in the direction of the second 9". This drawing together of the sleeves 9 causes each to register against a respective bearing cone 7, and the two cones are likewise drawn together; the result is that the cup and cone of each bearing are also drawn closer together—i.e. the entire unit is compacted by reason of the opposed forces acting from either end.

Sliding movement of the first sleeve 9' will cease once the reaction produced by the assembly of interconnected components—viz, the rotatable body 1, bearings 5 and external limiting means 9, is such as to offset the force imparted by the thrust means 43; on arrival at this point, the application of thrust is terminated.

As a result of forcibly drawing the assembly together, the cup and cone of each bearing 5 will be located in tight contact with their taper rollers 10, urged into position initially by the thrust means 43 and held fast thereafter by effect of the interference fit between the sleeves 9 and the shaft 2; in this state, the bearing 5 is clearly not permitted optimum conditions in which to roll.

Force applied by the thrust means 43 must be calculated to remain within given limits in order to avoid damaging the bearings during this step in which the components are compacted.

Figure 3:
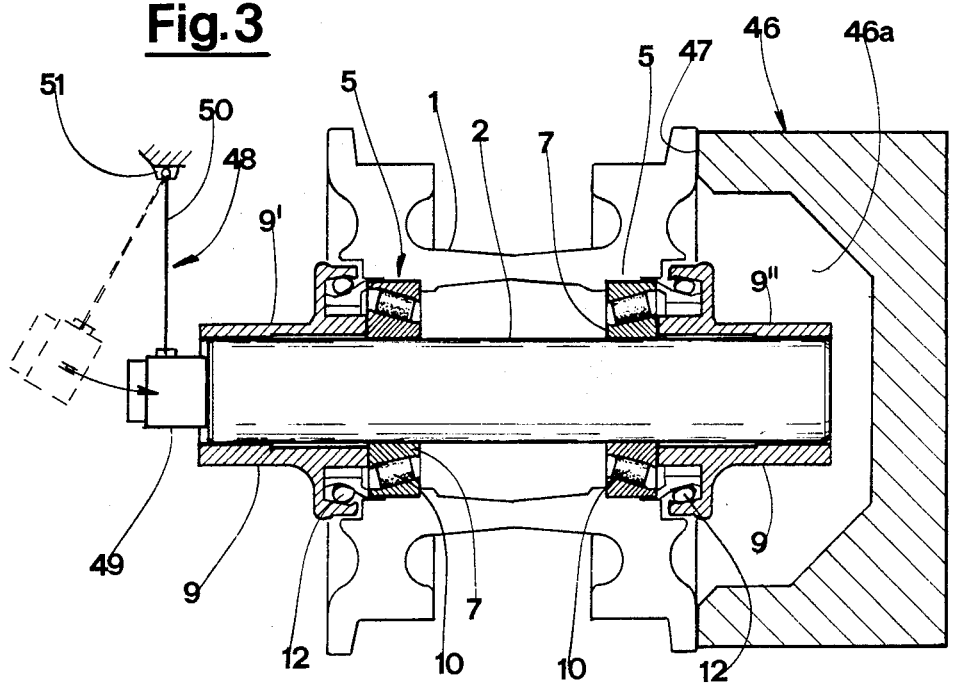
FIG. 3 is the schematic representation of a unit as in FIG. 1 with means for implementing that step of the method of assembly whereby components are separated.

The next step envisaged is that of spreading apart the external limiting means by an infinitesimal amount from the distance produced as a result of the previous compaction step. The step in question is illustrated schematically in FIG. 3, which shows a fixed reference block 46 offering a flat annular surface 47 against which that side face of the rotatable body 1 farthest from the first sleeve 9' is made to locate. The block 46 is provided with a recess 46a which both the end of the shaft 2 and the second sleeve 9" may penetrate. At the end opposite, 48 denotes means by which to produce mechanical impact, consisting of a striker 49 hinged by way of a rod 50 to a fixed point denoted 51. The striker 49 is of predetermined weight and is allowed to fall from a set height through a circular arc until striking the end of the shaft 2, thereby transmitting kinetic energy to the end of the shaft 2 and producing blows of a calculated intensity through the line of its axis. The combined effect of the blows imparted by the impact means 48 and the reaction of the reference block 46, is such as to occasion corresponding movements of the shaft 2 in relation to the rotatable body 1. The first sleeve 9' being checked by the rotatable body 1 through interposition of the respective bearing 5, the impact produced is such as to occasion a corresponding shift of this first sleeve 9' along the shaft 2, distancing it from the second sleeve 9". Each blow generates a thrust of intensity which outstrips the force of the interference fit between sleeve 9' and shaft 2, and since the blows administered are of calculated intensity, and offset by the strength of the interference fit (likewise calculated), each blow causes the sleeve 9' to shift in relation to the shaft 2 through a calculated distance (a few hundredths of a millimeter), within a tight range of tolerances. Thus, by striking a given number of blows (one or more), the two sleeves 9 are spread apart by a calculated amount so as to increase the distance arrived at following the previous step of compaction, and the cones 7 of the two bearings, which are not pressed onto the shaft, spread by the same calculated amount. The end-result of the step is that the cup and cone of each bearing are spread by half of the aforesaid calculated amount, creating the pre-load necessary for optimum rotation of the taper rollers 10.

It follows that machining tolerances adopted, for example, in establishing the distance between the shoulder 8, the axial width of the bearings, and the axial length of the sleeves 9' and 9", are unimportant, since pre-load of the bearings depends simply on a relative positioning of the sleeves that takes no account of the axial dimensions of component parts.

Figure 2:
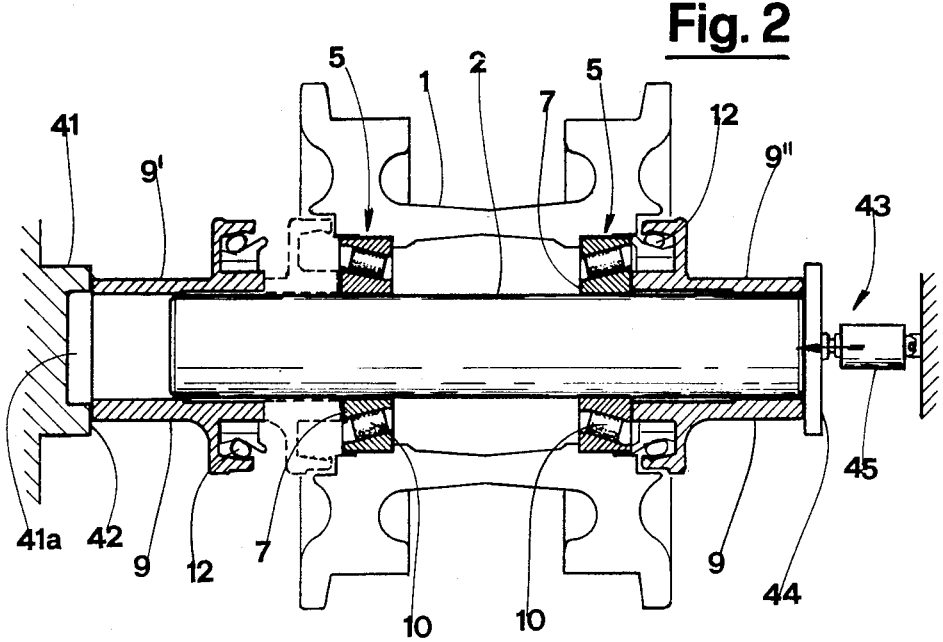
FIG. 2 is the schematic representation of a unit as in FIG. 1 with means for implementing the compaction step of the method of assembly.
Figure 4:
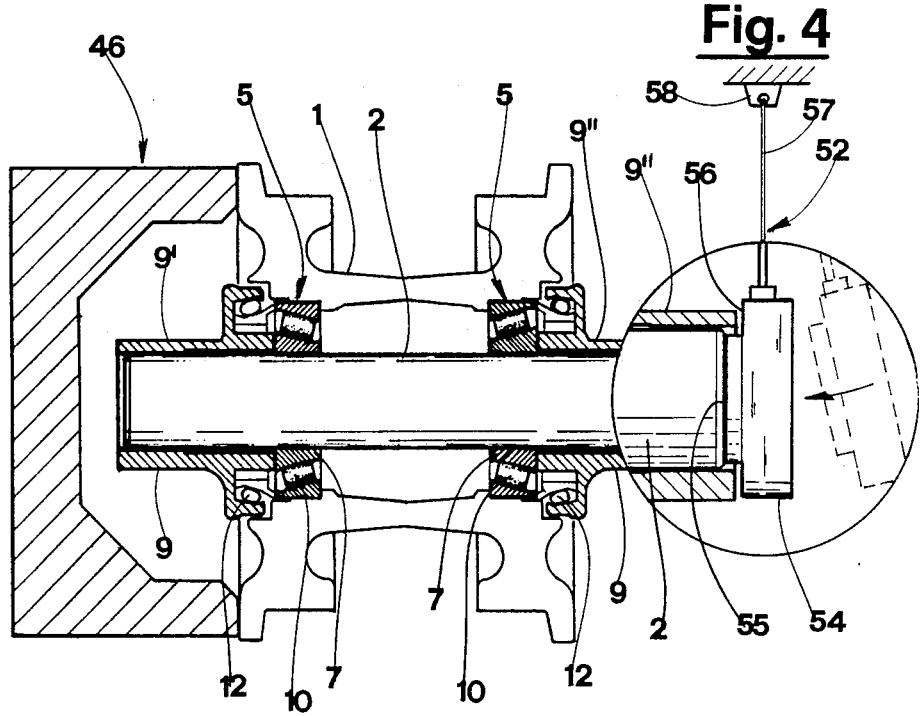
FIG. 4 illustrates an alternative embodiment of the means shown in FIG. 3.

FIG. 4 illustrates a further embodiment of the means by which sleeves 9 according to the invention are spread. The initial compaction is brought about by utilizing the same means as shown in FIG. 2, following which the endmost surfaces of the second sleeve 9" and of the shaft will lie within the same plane by reason of their locating against the flat plate 44 during the compaction stroke.

The means illustrated in FIG. 4 comprise a reference block 46 offering a flat surface against which the side face of the rotatable body 1 farthest from the second sleeve 9″ is made to locate. Impact means 52 at the remaining end of the shaft comprise a striker 54 hinged by way of a rod 57 to a fixed point denoted 58 and exhibiting two flat striking surfaces 55 and 56. The more central surface 55 of the two is designed to strike the butt of the shaft 2, and is proportioned so as penetrate the end of the sleeve 9″ but to make no contact therewith, whereas the remaining surface 56 is stepped toward the rear from the central surface 55 and designed to make contact with the butt of the sleeve 9″ only. The distance by which the two surfaces 55 and 56 are axially separated is equal to the calculated amount (a few hundredths of a millimeter) by which the two sleeves 9 are ultimately to be spread.

The impact means 52 operate in essentially the same way as the impact means 48 described above; being swung from above (or however propelled), the striker 54 is invested with kinetic energy, and its central surface 55 strikes the shaft, though the surface denoted 56 makes no contact with the sleeve 9″ initially by reason of its being stepped rearwards in relation to the central surface 55. The blows struck cause the shaft 2 to shift axially; the sleeve 9″ is checked by the reference block 46 however, so that relative shift between the sleeve 9″ and the shaft 2 must occur. Relative movement ceases once the central surface 55 penetrates into the sleeve 9″ to the point at which the stepped surface 56 locates against the sleeve 9″. The impact means 52 is then shut off, as relative shift produced between shaft 2 and sleeve 9″ matches the axial distance separating the two striker surfaces 55 and 56, and this axial distance reflects the calculated amount by which the two sleeves 9 are to be spread apart from the distance arrived at by compaction in order to pre-load the bearings 5 with optimum end float.

Figure 5:
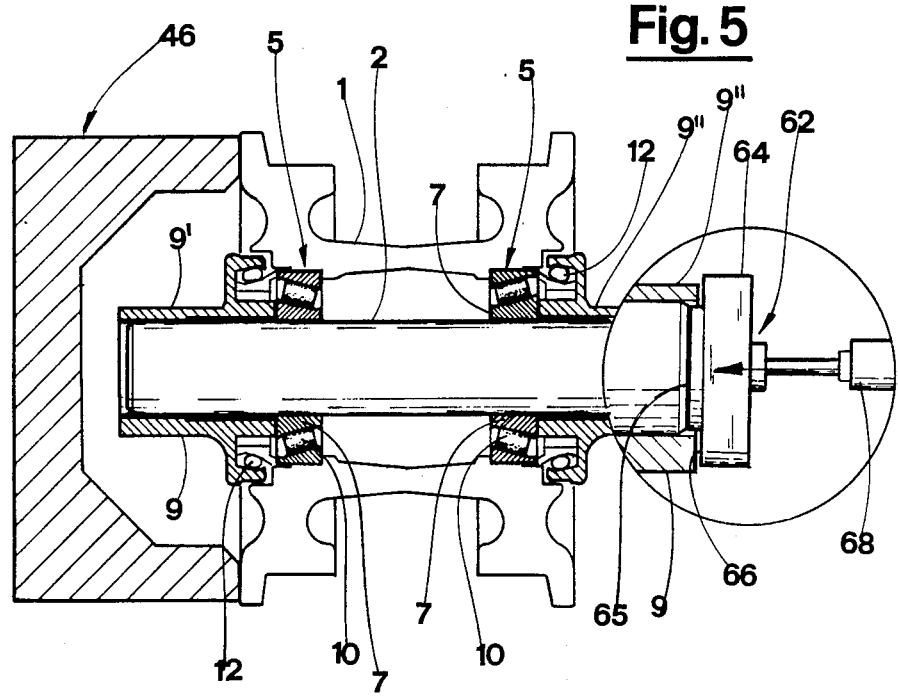
FIG. 5 illustrates a further alternative embodiment of the means shown in FIG. 3.

FIG. 5 illustrates a further embodiment of the means by which sleeves 9 according to the invention are spread. The initial compaction is brought about utilizing the same means as shown in FIG. 2, following which the endmost surfaces of the second sleeve 9″ and of the shaft will lie within the same plane by reason of their locating against the flat plate 44 during the compaction stroke.

The means illustrated in FIG. 5 comprise a reference block 46 offering a flat surface against which the side face of the rotatable body 1 farthest from the second sleeve 9″ is made to locate. Thrust means 62 located at the remaining end of the shaft, and designed to produce axial movement thereof, comprise a contact block 64 and a ram 68. The block 64 is of substantially the same shape as the striker 54 of FIG. 4, with two contact surfaces 65 and 66, the one surface 65 designed to register with the butt of the shaft 2, the other surface 66, which is stepped toward the rear, designed to make contact with the annular butt of the sleeve 9″. The distance by which the two surfaces 65 and 66 are axially separated is equal to the calculated amount by which the distance between the two sleeves 9 is ultimately to be lengthened. The central surface 65 urges against the shaft, though the stepped surface 66 makes no contact with the sleeve 9″ initially. The force of the ram 68 is such that the shaft 2 is shifted axially, whereas the sleeve 9″ is checked by the reference block 46, and relative shift is thus occasioned between sleeve 9″ and shaft 2. Relative movement ceases once the first surface 65 has penetrated the sleeve 9″ to the point where the stepped surface 66 registers against the sleeve 9″. The thrust means 62 are then deactivated, as the relative shift between shaft 2 and sleeve 9″ matches the amount by which the two sleeves 9 are to be spread apart in order to pre-load the two bearings with optimum end float.

FIG. 6 illustrates a further embodiment of the means by which the two sleeves 9′ and 9″ are spread apart. Initial compaction is brought about utilizing the same means as shown in FIG. 2, following which the endmost surfaces of the second sleeve 9″ and of the shaft will lie within the same plane by reason of their locating against the flat plate 44 during the compaction stroke.

Means illustrated in FIG. 6 comprise a fixed and rigid reference block 71 offering a flat surface 72 against which the butt ends of the shaft 2 and of the second sleeve 9″ are made to locate. Use is made, at the end opposite, of the same impact means 48 as described above, consisting of a striker 49 hinged by way of a rod 50 to a fixed point 51. The striker 49 is of predetermined weight and is allowed to fall from a set height through a circular arc until striking the end of the shaft 2 farthest from that located against the reference surface 72.

Whilst the blow or blows administered by the impact means 48 will not displace the shaft 2 (which is impeded by the reference block 71), corresponding axial shift of the first sleeve 9′ along the shaft 2 away from the second sleeve 9″ does in fact occur, and by infinitesimal amounts of the required length. Such an occurrence is explained, at least in part, by the fact that the preceding step of compaction sets up elastic reaction forces between the interconnected components that tend to spread the two sleeves 9′ and 9″, and are offset by the force of the interference fit between the sleeves 9 and 9″ and the shaft 2; the result is that such forces remain pent up within the unit.

With each blow administered to the shaft 2 by the impact means 48, slight vibrations are set up in the shaft during which the lock between sleeve 9 and shaft 2 is loosened, and during which the forces pent up in the components thus outstrip the force of the interference fit causing the first sleeve 9′ to creep along the shaft 2; the second sleeve 9″ will remain undisturbed, however, registering as it does against the reference surface 72 together with the shaft 2.

In the system of FIG. 6, a blow struck with given intensity produces corresponding shift of the sleeve 9′ along the shaft 2 which is of an unchanging entity, according to a physical law that remains substantially constant; thus, administering such blows will spread the sleeves 9′ and 9″ by the prescribed amount and ensure optimum pre-load of the bearings 5.

The method and means of assembly described in the foregoing are illustrated with reference to taper roller bearings, but are equally applicable to ball bearings with inner and outer rings lying in respective common radial planes. The relative axial position of the rings in such bearings must be adjusted likewise, so as to enable an optimum roll of the balls.

What is claimed is:

1. A method of assembly for units having a shaft and a rotatable body in rolling contact, said units serving as a roller or wheel in earth-moving vehicles and being of a type comprising a pair of limiting means fixed integrally with the shaft or with the rotatable body and being disposed singly at two sides of the rotatable body, said limiting means being designed to check axial movement of the rotatable body, steps of which include:

compaction of the rotatable body and limiting means interconnected in an assembly thereof with said shaft by applying an amount of thrust sufficient to draw at least a first of the limiting means toward its counterpart along the axial direction of said shaft, to the point where a reaction produced by said assembly of said rotatable body and interconnected limiting means is equal to said thrust, wherein said first limiting means consists of a check element pressed either orto the shaft or into the the axial bore of the rotatable body such that an interference fit is created of strength sufficient to withstand an amount of external thrust for which said unit is designed, and wherein the thrust applied during such compaction exceeds a force created by the interference fit between said check element and shaft, or between said check element and rotatable body; and subsequent spread of said limiting means from each other in said axial direction by a calculated infinitesimal amount, thus lengthening the distance therebetween provided by said step of compaction, wherein sufficient further thrust is applied to cause at least one of the limiting means to slide with respect to the other in said axial direction 2. The method of assembly as in claim 1, said pair of limiting means comprising locked axially to the shaft and designed to check axial shift of said shaft in said axial direction, and a pair of bearing located between the rotatable body and the external limiting means each of which has two rings capable of relative axial movement in said axial direction, one such ring of each said bearing being integrally attached with the rotatable body and checked axially with respect thereto by respective internal limiting means, the remaining ring fitting positively over the shaft and being checked axially by a respective one of said external limiting means, each said external limiting means being located externally of the respective bearing and registering with a side face of the respective ring, said method comprising:

said compaction step occurring via the two rings of each bearing and a respective intermediate rolling component in each said bearing, wherein said reaction is produced by said assembly of rotatable body, bearings and limiting means to become equal to said thrust, wherein each said external limiting means includes a respective check element pressed onto the shaft such that said interference fit is created of strength sufficient to withstand said external thrust for which said unit is designed, and wherein said thrust applied during such compaction to exceed said force created by the interference fit is between the respective check element and the shaft; and said subsequent spread being of said external limiting means to thereby produce a requisite distance between the two rings of each said bearing 3. The method of assembly as in claim 2, wherein (9) the step of spreading said external limiting means is produced by checking one of the two external limiting means axially, while causing the shaft to slideably shift in the axial direction away from the checked external limiting means toward the unchecked external limiting means.

4. The method of assembly as in claim 3, wherein the sliding shift of the shaft in said axial direction is produced by administering one or more blows of calculated intensity to the shaft, each said blow being struck along the axial direction.

5. The method of assembly as in claim 3, wherein axial shift of the shaft in said axial direction with respect to said external limiting means is produced by applying continuous thrust of a calculated maximum force to the shaft along said axial direction.

6. The method of assembly of claim 2, wherein the interference fit between the shaft and external limiting means is of a considerable accuracy ensured by machining to close tolerance and by precise proportioning of the dimensions thereof.

7. The method of assembly as in claim 2, wherein the step of spreading the external limiting means involves locating one end of the shaft against a fixed and rigid reference block, and administering one or more blows of calculated intensity to the remaining end of the shaft, each said blow being struck in said axial direction.

8. The method of assembly as in claim 7, wherein the step of spreading the external limiting means involves locating both of said one end of the shaft and one end of a respective external limiting means against said reference block, prior to said administering of each said blow.

9. A unit consisting of a shaft and rotatable body in rolling contact, serving as roller or wheel in earth-moving vehicles and made according to the method of claim 1, and comprising:

a rotatable body (1), which functions as the roller or wheel, and a pair of bearings (5) by way of which the body (1) is paired in rolling contact with the shaft (2), the outer ring (6) of which is integral with the surface of the bore (4) of the body (1) and checked axially by a shoulder (8) offered by the body itself, against which the inside face of the ring (6) registers, the inner ring (7) fitting positively over the shaft (2); and a pair of external limiting means (9) integral with the shaft and registering against the external face of the inner ring (7) of each bearing, designed to prevent axial drift of the inner rings (7) along the shaft (2);

wherein at least one of the external limiting means (9) consists of an annular check element (9', 9") pressed onto the shaft (2) in order to create an interference fit of strength calculated to withstanding a given intensity of thrust load to which the body (1) becomes subject in relation to the shaft (2) with the vehicle in service.

10. A unit consisting of a shaft and rotatable body in rolling contact, serving as roller or wheel in earth-moving vehicles, made according to the method of claim 1.

* * * * *